United States Patent
Kasher et al.

(10) Patent No.: US 10,772,069 B2
(45) Date of Patent: Sep. 8, 2020

(54) PASSIVE POSITIONING USING DIRECTIONAL TRANSMISSIONS

(71) Applicant: QUALCOMM Incorporated, San Diego, CA (US)

(72) Inventors: Assaf Yaakov Kasher, Haifa (IL); Amitai Abramson, Tel Aviv (IL); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/963,447

(22) Filed: Apr. 26, 2018

(65) Prior Publication Data

US 2018/0317042 A1    Nov. 1, 2018

Related U.S. Application Data

(60) Provisional application No. 62/491,190, filed on Apr. 27, 2017.

(51) Int. Cl.
| | |
|---|---|
| *H04W 64/00* | (2009.01) |
| *H04W 72/04* | (2009.01) |
| *G01S 5/08* | (2006.01) |
| *H04W 16/28* | (2009.01) |
| *G01S 5/12* | (2006.01) |
| *H04W 4/02* | (2018.01) |
| *H04L 27/26* | (2006.01) |
| *H04W 84/12* | (2009.01) |
| *G01S 5/10* | (2006.01) |
| *G01S 3/66* | (2006.01) |

(52) U.S. Cl.
CPC ............ *H04W 64/006* (2013.01); *G01S 5/08* (2013.01); *G01S 5/12* (2013.01); *H04W 4/02* (2013.01); *H04W 16/28* (2013.01); *H04W 72/048* (2013.01); *G01S 3/66* (2013.01); *G01S 5/10* (2013.01); *H04L 27/2611* (2013.01); *H04W 64/00* (2013.01); *H04W 84/12* (2013.01)

(58) Field of Classification Search
CPC ..... G01S 3/66; G01S 5/08; G01S 5/10; G01S 5/12; H04L 27/2611; H04W 16/28; H04W 4/02; H04W 64/00; H04W 64/006; H04W 72/048; H04W 84/12
See application file for complete search history.

(56) References Cited

U.S. PATENT DOCUMENTS

| | | | | |
|---|---|---|---|---|
| 2007/0076638 | A1* | 4/2007 | Kore | G01S 1/66 370/310 |
| 2014/0133344 | A1* | 5/2014 | Seitz | G01S 5/10 370/252 |
| 2014/0357292 | A1* | 12/2014 | Walma | H04W 64/00 455/456.1 |

(Continued)

FOREIGN PATENT DOCUMENTS

EP    2278352 A2    1/2011

OTHER PUBLICATIONS

Partial International Search Report—PCT/US2018/029877—ISA/EPO—dated Jul. 3, 2018.

(Continued)

*Primary Examiner* — Jaime M Holliday
(74) *Attorney, Agent, or Firm* — Steven R. Thiel

(57) ABSTRACT

Certain aspects of the present disclosure provide methods and apparatus for enhancing a beamforming training procedure.

8 Claims, 18 Drawing Sheets

(56) References Cited

U.S. PATENT DOCUMENTS

| | | | | |
|---|---|---|---|---|
| 2015/0119074 A1* | 4/2015 | Holz | ................ | G01S 1/66 |
| | | | | 455/456.1 |
| 2015/0133173 A1* | 5/2015 | Edge | ................ | G01S 1/66 |
| | | | | 455/456.6 |
| 2016/0119770 A1* | 4/2016 | Ryu | ................ | H04W 8/005 |
| | | | | 370/328 |
| 2017/0085306 A1* | 3/2017 | Cariou | ................ | H04B 7/0452 |

OTHER PUBLICATIONS

International Search Report and Written Opinion—PCT/US2018/029877—ISA/EPO—dated Aug. 24, 2018.

\* cited by examiner

| Name | Size (octets) | Description |
|---|---|---|
| BSSid | 6 | BSSid of the AP |
| LCI (Location Identifier) (RFC 2665) | 32 | Accurate location of the AP |
| Number of Sectors | 2 | Number of sector is for passive location |
| For each Sector: | 4 octets | |
| • Sector AZ<br>• Sector EL<br>• Sector AZ Width<br>• Sector EL Width | 11bit<br>11bit<br>5 bit<br>5 bit | Degrees/4<br>Degrees/4<br>Degrees*3<br>Degrees*3 |
| Accurate Altitude Above floor | 2 | In units of 1mm. |
| Time Between Sectors | 3 | In units of 100ps |
| Channel | 1 | DMG channel ID |

FIG. 13A

| Name | Size (octets) | |
|---|---|---|
| Number of participation APs | 1 | |
| APs BSSDs | 6*6 | BSSid of participating APs |
| Time of next Sector Sweep | 2 | Time from the start of the Message to when the Master AP start the sector sweep TUs |
| Order of the APs in the sector sweep | 6 | |
| Sector Sweep Identifier | 3 | An Identifier for the specific sector sweep. |

FIG. 13B

PASSIVE POSITIONING USING DIRECTIONAL TRANSMISSIONS

CLAIM OF PRIORITY UNDER 35 U.S.C. § 119

The present Application for Patent claims benefit of U.S. Provisional Patent Application Ser. No. 62/491,190, filed Apr. 27, 2017, assigned to the assignee hereof and hereby expressly incorporated by reference herein.

FIELD

Certain aspects of the present disclosure generally relate to wireless communications and, more particularly, to enhancing passive positioning procedures.

BACKGROUND

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second. Certain wireless communications standards, such as the Institute of Electrical and Electronics Engineers (IEEE) 802.11standard. The IEEE 802.11 standard denotes a set of Wireless Local Area Network (WLAN) air interface standards developed by the IEEE 802.11 committee for short-range communications (e.g., tens of meters to a few hundred meters).

Amendment 802.11ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

Some protocols have been devised that use such directional transmissions to passively determine relatively accurate (absolute or relative) positions of devices. In passive positioning, non-access point (AP) stations (STAs) only listen to frame exchanges between APs. By measuring the time these frames are received at the device and a time difference reported by the APs, such STAs can estimate their location. As noted above, however, because transmissions are highly directed in certain bands (e.g., the 60 GHz band) in order to achieve reasonable gain, when the APs communicate between themselves, it is unlikely that the passively listening STAs will receive these transmissions.

Active positioning protocols are based on round trip time (RTT) and angle of arrival (AoA) of transmitted frames. Unfortunately, these methods require separate frame exchanges between stations (STAs). When the number of STAs interested in finding their location becomes high (e.g., some scalable applications may support up to 200 stations per access point AP), the frame exchanges required for measuring the RTT and AoA may take too much air time, thus hampering actual data transmission.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes an interface configured to obtain a first frame having an indication of a first direction of transmission of the first frame relative to a position of a first wireless node, and to obtain a second frame having an indication of a second direction of transmission of the second frame relative to a position of a second wireless node. The apparatus also includes a processing system configured to estimate a position of the apparatus based on the first direction, the second direction, the absolute position of the first wireless node, and the absolute position of the second wireless node.

Certain aspects of the present disclosure provide an apparatus for wireless communications. The apparatus generally includes an interface configured to obtain a first frame from a first wireless node, to obtain a second frame from a second wireless node, and to obtain a third frame from a third wireless node (and possibly a fourth frame from a fourth wireless node). The apparatus also includes a processing system configured to estimate a first angle of arrival of the first frame, a second angle of arrival for the second frame, and a third angle of arrival of the third frame, estimate a first angle between vectors pointing from the apparatus to the first and second wireless nodes, based on the first and second angles of arrival, and a second difference angle between vectors pointing from the apparatus to the second and third wireless nodes, based on the second and third angles of arrival, and estimate a position of the apparatus based on the first and second difference angles.

Certain aspects of the present disclosure provide an apparatus for wireless communications. The apparatus generally includes an interface configured to obtain a first frame from a first wireless node having an indication of a first transmit time the first frame was transmitted, and to obtain a second frame from a second wireless node having an indication of a second transmit time the second frame was transmitted and an indication of a first elapsed time since the second wireless node received a first reference frame from the first wireless node. The apparatus also includes a processing system configured to estimate a first time difference between a time of flight of the first frame and a time of flight of the second frame, based on an arrival time of the first frame, the first transmit time, an arrival time of the second frame, the second transmit time, and the first elapsed time, and to estimate a position of the apparatus based on the first time difference.

Aspects of the present disclosure also provide various methods, means, and computer program products corresponding to the apparatuses and operations described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 13A and 13B illustrate examples of static and dynamic information for passive location estimation, in accordance with certain aspects of the present disclosure.

DETAILED DESCRIPTION

Figure 1:
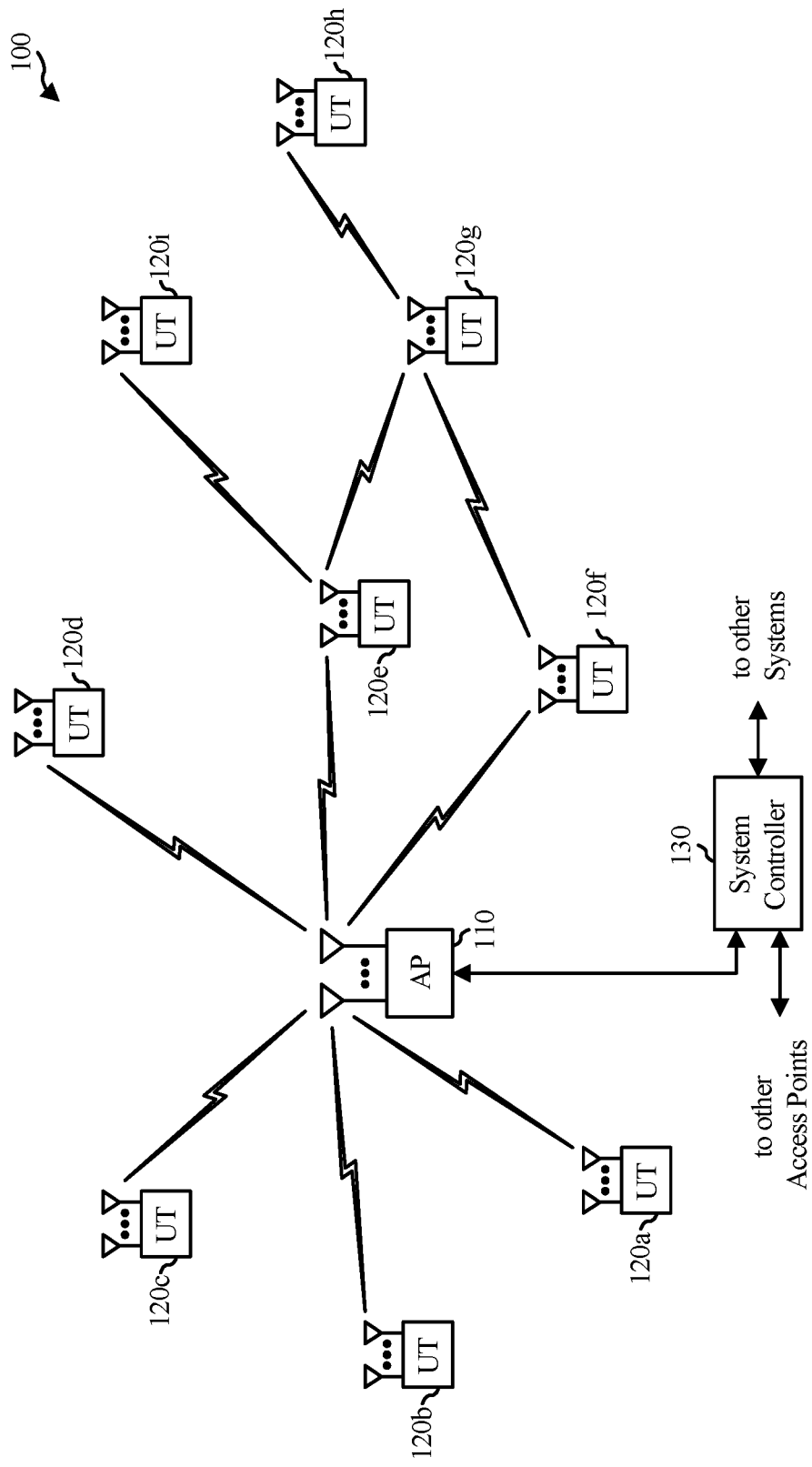
FIG. 1 is a diagram of an example wireless communications network, in accordance with certain aspects of the present disclosure.

Certain aspects of the present disclosure provide methods and apparatus for performing positioning based on directional transmissions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
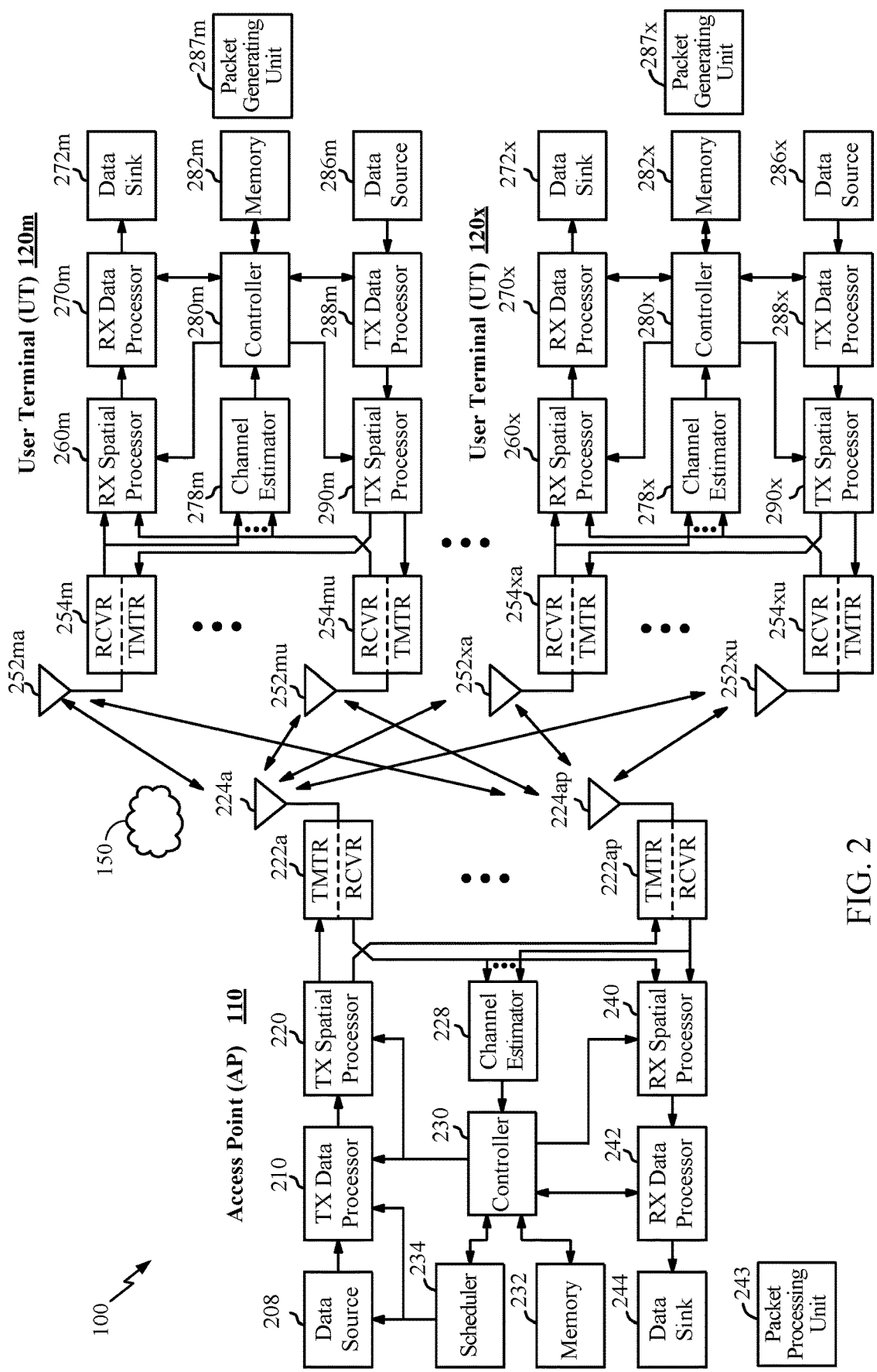
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ receive symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
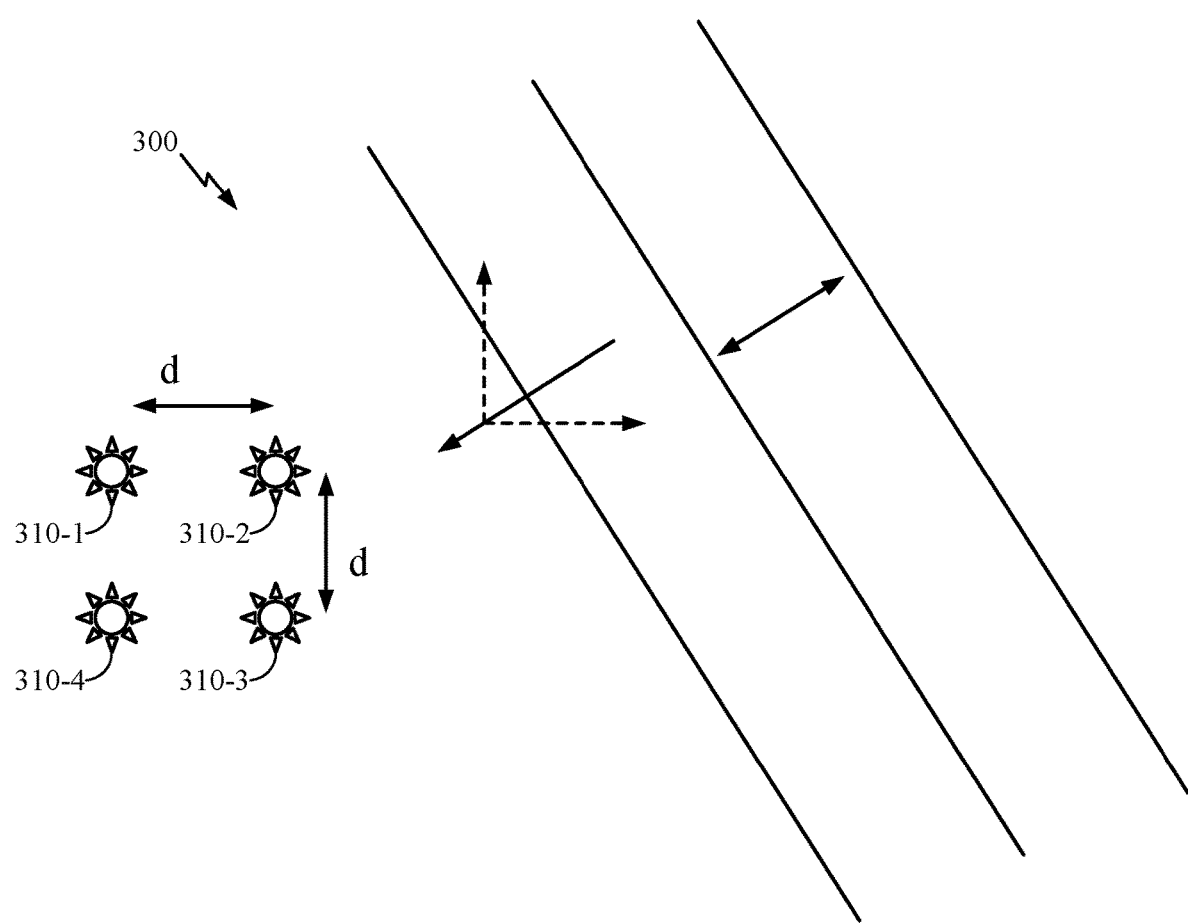
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

Example Beamforming Training Procedure

In high frequency (e.g., mmWave) communication systems like 60 GHz (e.g., 802.11ad and 802.11ay), communication is based on beamforming (BF), using phased arrays on both sides for achieving good link. As described above, beamforming (BF) generally refers to a mechanism used by a pair of STAs to adjust transmit and/or receive antenna settings achieve desired link budget for subsequent communication.

As will be described in greater detail below, in some cases, frames transmitted during BF training may be used for positioning purposes.

Figure 4:
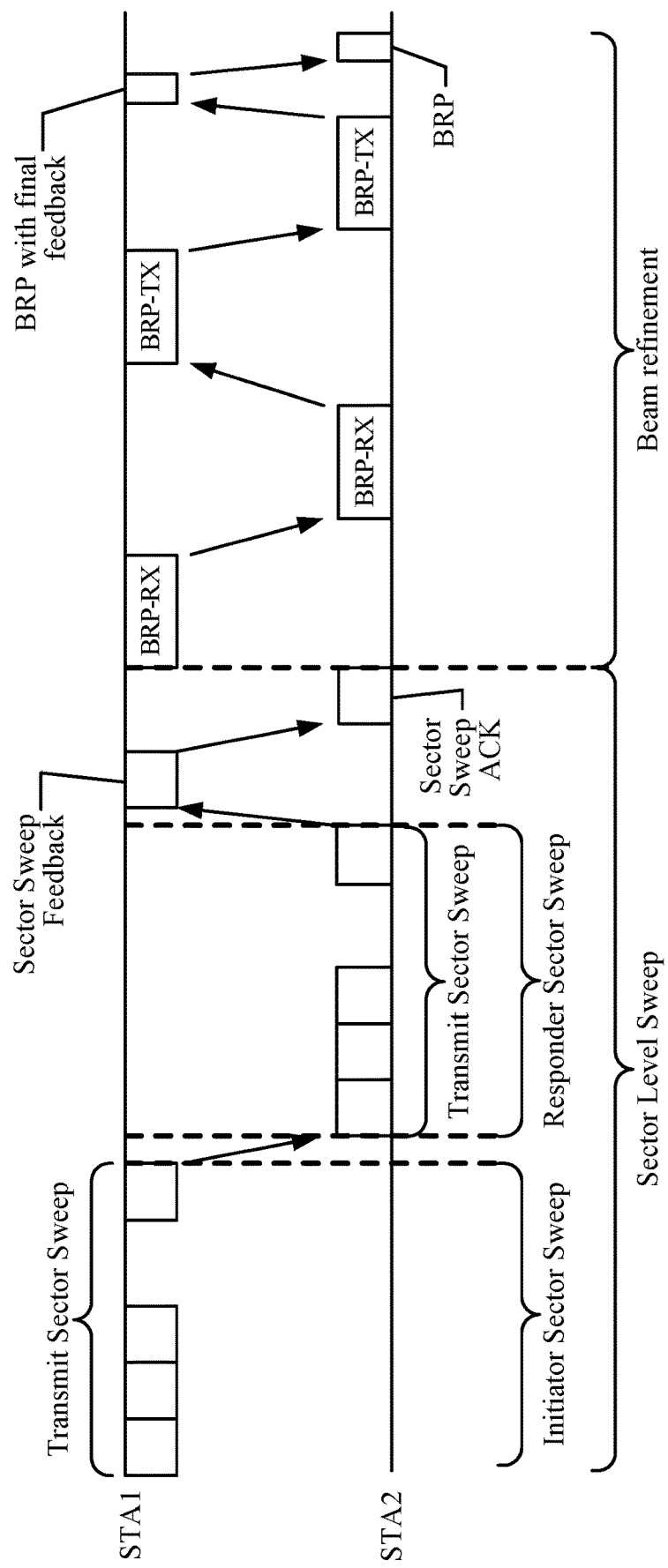
FIG. 4 illustrates an example beamforming training procedure.

As illustrated in FIG. 4, BF training typically involves a bidirectional sequence of BF training frame transmissions between stations (STA1 and STA2 in this example) that uses a sector sweep followed by a beam refining phase (BRP). For example, an AP or non-AP STA may initiate such a procedure to establish an initial link. During the sector sweep, each transmission is sent using a different sector (covering a directional beam of a certain width) identified in the frame and provides the necessary signaling to allow each STA to determine appropriate antenna system settings for both transmission and reception.

As illustrated in FIG. 4, in all cases where the AP has large number of elements, the sectors used are relatively narrow, causing the SLS (Sector Level Sweep) process to be long. The higher the directivity more sectors are needed and therefore the SLS is longer. As an example, an AP with an array of 100 antenna elements may use 100 sectors. This situation is not desired since SLS is an overhead affecting throughput, power consumption and induces a gap in the transport flow.

Various techniques may be used to try and reduce throughput time. For example, short SSW (SSSW) messages may be used instead of the SSW messages, which may save some time (e.g., about 36%). In some cases, throughput may be reduced by utilizing the fact that in such APs the transmitter can transmit via several RF chains. This facilitates transmission in parallel on several single channels. It can shorten the scan by the factor number of frequencies (2 or 3 or 4). Unfortunately, this approach may require the receiver to support the multiple frequencies scan, and it is not backward compatible (e.g., with 802.11ad devices) and requires the stations to fully be aware of this special mode in advance. In some cases, the Tx SLS+Rx SLS or the Tx SLS+Rx BRP may be replaced with a new Tx+Rx BRP where only one "very" long BRP message is used with many TRN units. Unfortunately, this method requires a very long message but may be able to support multiple STAs in parallel, making it efficient but only in cases with a large number of STAs.

Example Passive Positioning Based on Directional Transmissions

Aspects of the present disclosure provide techniques that may allow for passive positioning estimates using directional transmissions. As noted above, conventional passive positioning algorithms that relied on transmissions between APs were challenged because, due to the high directionality of such transmissions, it was often unlikely that the passively listening STAs would receive such transmissions.

Certain techniques presented herein, however, address this issue by utilizing transmissions sent in different directions, such as frames sent during a sector sweep procedure. In addition to taking advantage of the sweep across multiple directions, certain aspects also exploit the known timing relationship between different frames transmitted during a sector sweep. In other words, given the sector IDs from multiple frames, the difference in when those frames were transmitted can be determined. Coupled with knowledge of arrival time, a time of flight of a frame may be determined (e.g., time of flight as calculated as the difference from the time of departure to the time of arrival) and used for position estimates.

Such position estimates may be used for a variety of purposes, such as updating scene information in VR or AR applications, based on relative position or orientation of a wireless device. In such cases, the position estimate may be passed on to an application layer. As another example, a position may be reported back to a network entity (e.g., an AP or central controller) for tracking a wireless device. As still another example, an estimated position may be used to determine available services in an area.

In some cases, the techniques presented herein may be performed based on transmissions that naturally occur. For example, certain applications like Virtual Reality and Augmented Reality typically demand high gain beam links at each data transaction. Periodic beamforming training (or refinement) at each link access may be used to meet this demand. This periodic training may also provide opportunities for passive positioning.

Passive positioning techniques presented herein may have various benefits. For example, many STAs can get their location using the same set of sector sweeps (i.e., load is not linear with number of STAs location measurements). Techniques may be considered fully-passive or semi-passive.

In a fully passive case, there is no need for the exchange of messages between any of the STAs and the APs during the location process. In other words, all the information needed for location is carried in the sector sweep (although this may the sector sweep longer because of additional amount of information). In a semi-passive case, information about the sector sweep timing and the location of the APs is available to the STAs, for example, via a location configuration information (LCI) message. STAs may be associated with one of the APs to securely get the information from that AP. STAs may get at least some of the information out of band (OOB) from a non-serving AP.

As will be described in greater detail below, such information may be gathered in what is referred to herein as a setup phase, while actual (time and/or directional) measurements may be taken during what is referred to herein as a location phase.

For example, in a setup phase, 60 GHz APs may indicate capability to send passive 60 GHz location info. 5 GHz APs may indicate static/dynamic information to use for 60 GHz based positioning. In response to a STA request, an AP sends static and dynamic passive 60 GHz information. Exactly what type of measurements (time, angle of arrival, or angle of departure) a STA makes, based on this (static and dynamic) information to estimate position then varies based on the particular algorithm. In some cases, while a master AP performs a sector sweep, secondary APs synchronize their timing to master, while a STA measures (time, AOA, AOD). The STA makes further measurements while each secondary AP performs their own sector sweep.

In some cases, a station may perform positioning based on a transmission direction, which may be represented as an angle of departure (AoD), of transmissions from different wireless devices (e.g., APs).

Figure 5:
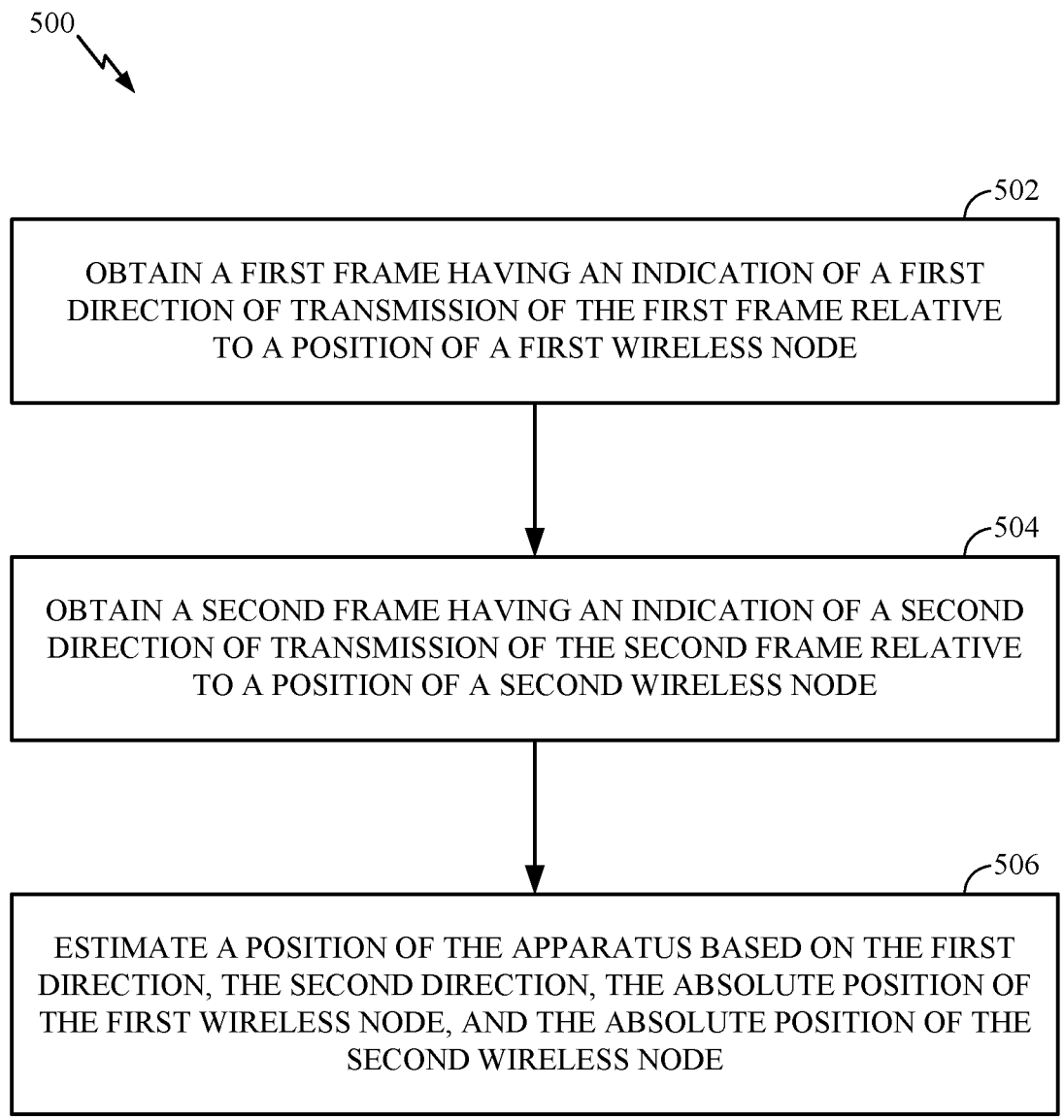
FIG. 5 illustrates example operations for performing positioning according to a first algorithm, in accordance with certain aspects of the present disclosure.

For example, FIG. 5 illustrates example operations 500 for estimating position based on directions of transmission from three different wireless devices, in accordance with certain aspects of the present disclosure. The operations 500 may be performed, for example, by a STA in a general region that is within the transmission range of three APs.

The operations 500 begin, at 502, by obtaining a first frame having an indication of a first direction of transmission of the first frame relative to a position of a first wireless node. At 504, the STA obtains a second frame having an indication of a second direction of transmission of the second frame relative to a position of a second wireless node. At 506, the STA estimates a position of the apparatus based on the first direction, the second direction, the absolute position of the first wireless node, and the absolute position of the second wireless node.

Figure 6:
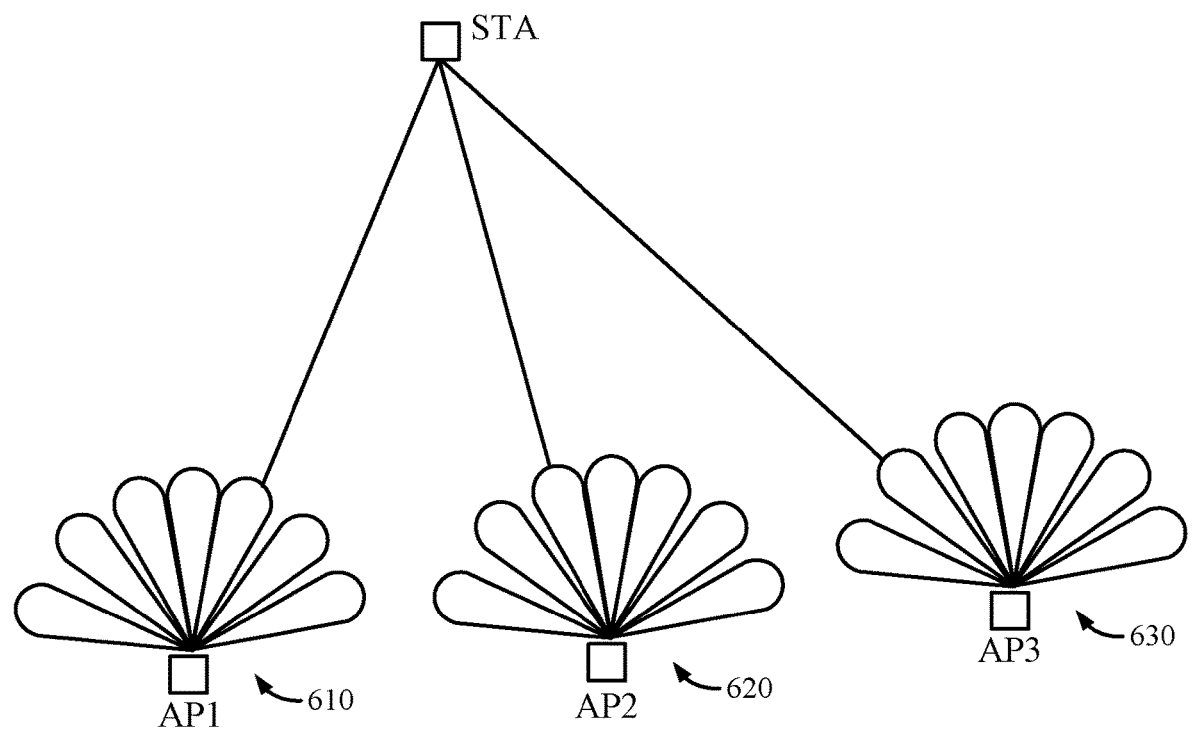
FIGS. 6 and 6A illustrate example directional transmissions from multiple base stations that may be used to estimate position according to the first algorithm, in accordance with certain aspects of the present disclosure.

As noted above, the direction of transmission of each frame may, for example, be provided as an AoD (e.g., relative to some reference line or plane). FIG. 6 illustrates an example STA that may perform AoD based positioning, for example, based on transmissions from 3 APs (AP1, AP2, and AP3). For AoD based location estimations, each AP may transmit a transmit sector sweep. As shown, in a sector sweep, AP1 may transmit packets in many different directions with the intention of enabling a receiving device to choose a best transmit sector. As illustrated, AP1 may sweep using different transmit sectors 610, AP2 may sweep using different transmit sectors 620, while AP3 may sweep using different transmit sectors 630.

Figure 6A:
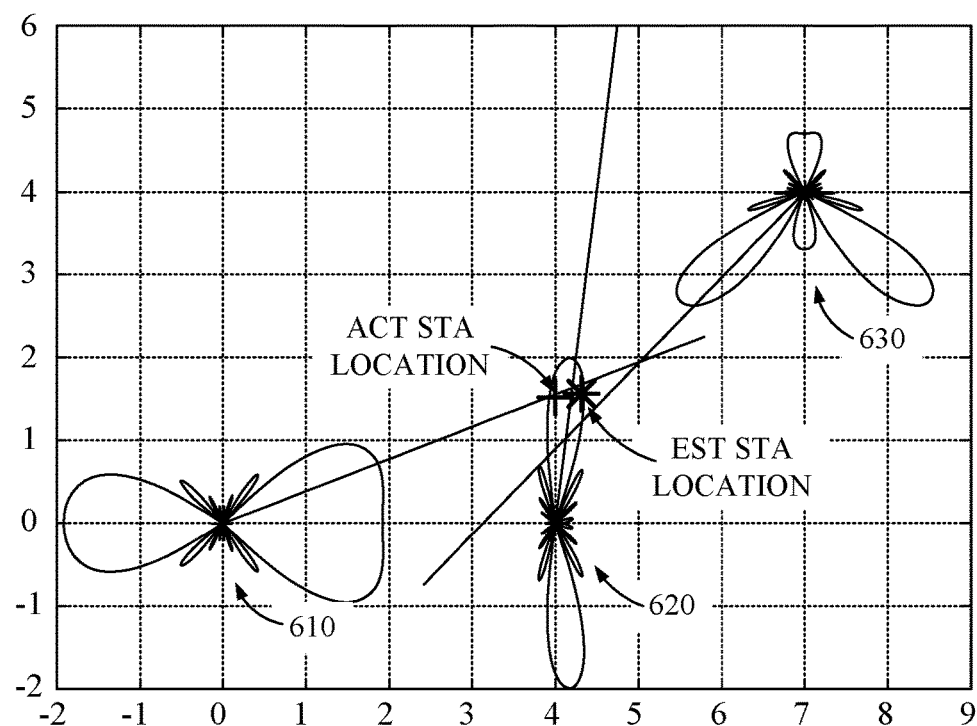

As illustrated in FIG. 6A, as each AP performs its sector sweep, the STA can determine the AoD based on the sector index of the sector with the best power and refines the direction based on the sector sweep of the TRN fields. The sector for the TRN field with the best power corresponds to a direct line to the AP performing the sweep. As illustrated in FIG. 6A, by calculating an intersection of lines corresponding to these directions, a STA may be able to relatively accurately estimate its location. In some cases, interpolation between sectors may help improve accuracy. In addition, accuracy may be improved by sending TRN fields with denser sector coverage or narrower sectors.

For AOD based location, as proposed herein, each AP may attach to each transmitted packet information (e.g., via an information element) about its location, and the direction (e.g., absolute direction, using earth coordinates) in which the packet was transmitted. Based on this information, the STA may make position estimates. As illustrated in FIG. 6A, the STA position may be estimated based on an intersection of lines (vectors) extending in the indication directions from the indicated positions of the APs providing this information (e.g., given position vector equations derived from the information provided). One advantage is this technique may not require stringent synchronization.

In other realizations, each AP may transmit its location in other frequency bands. For example, a 60 GHz AP may transmit this information using a corresponding 2.4/5 GHz AP. In this case, this information may not need to be transmitted in each packet of the sector sweep.

Figure 7:
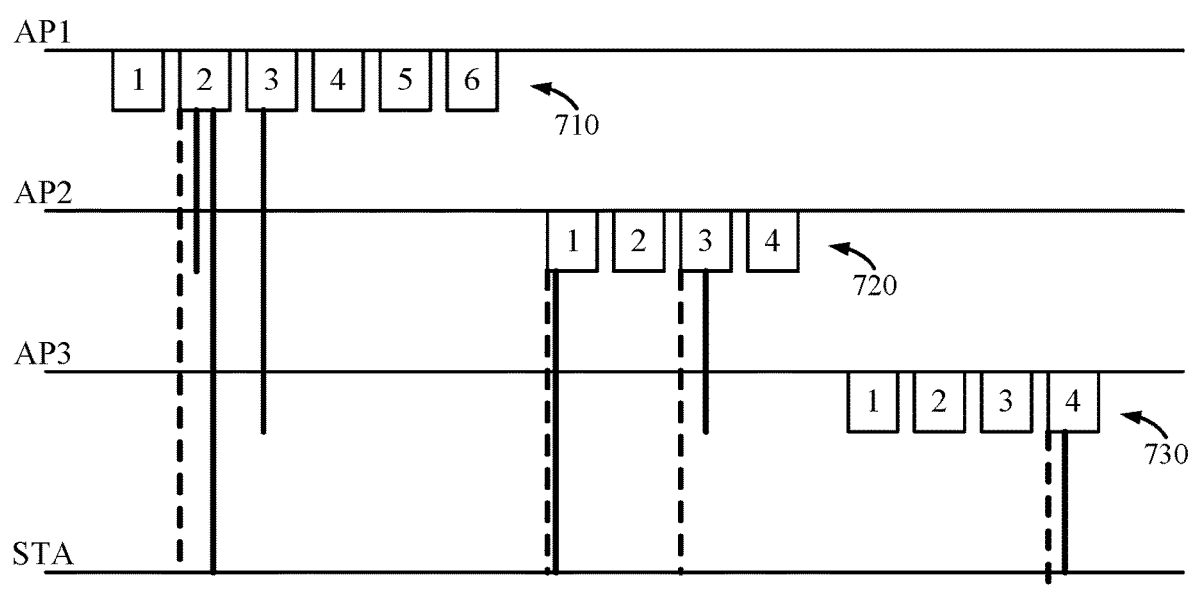
FIG. 7 illustrates how sector sweeps from different APs may be staggered, in accordance with certain aspects of the present disclosure.

As illustrated in FIG. 7, it may be sufficient that the APs do not transmit their sectors sweeps concurrently. In this case, AP1 transmits frames 710, then AP2 transmits frames 720 and, finally, AP3 transmits frames 730. Each frame may have an indication of the transmit sector used for transmission and the number of frames in a sweep may be the same or different (e.g. in the illustrated example, Tx Sectors 1 . . . 6 for AP and Tx Sectors 1 . . . 4 for each of AP2 and AP3).

As illustrated by the lines, some frames may reach the STA (indicated by the solid lines), while others frames may not (indicated by the dashed lines). In the example illustrated in FIG. 7, the STA is able to receive a frame transmitted with Tx Sector 2 from AP1, a frame transmitted with Tx Sector 1 from AP2, and a frame transmitted with Tx Sector 4 from AP3.

Given the information in each such frame (packet) about the location of the corresponding AP and the direction, a STA may be able to estimate its own position (e.g., its absolute position or position relative to APS 1-3). This technique may be fairly accurate, with the ultimate accuracy varying based on the Tx sector width used by each transmitting device. For example, the sector width can be between 30° for small arrays and 5° degrees for massive arrays.

Aspects of the present disclosure also provide techniques where a station may perform positioning based on an arrival direction, which may be represented as an angle of arrival (AoA), of transmissions from different wireless devices (e.g., APs).

Figure 8:
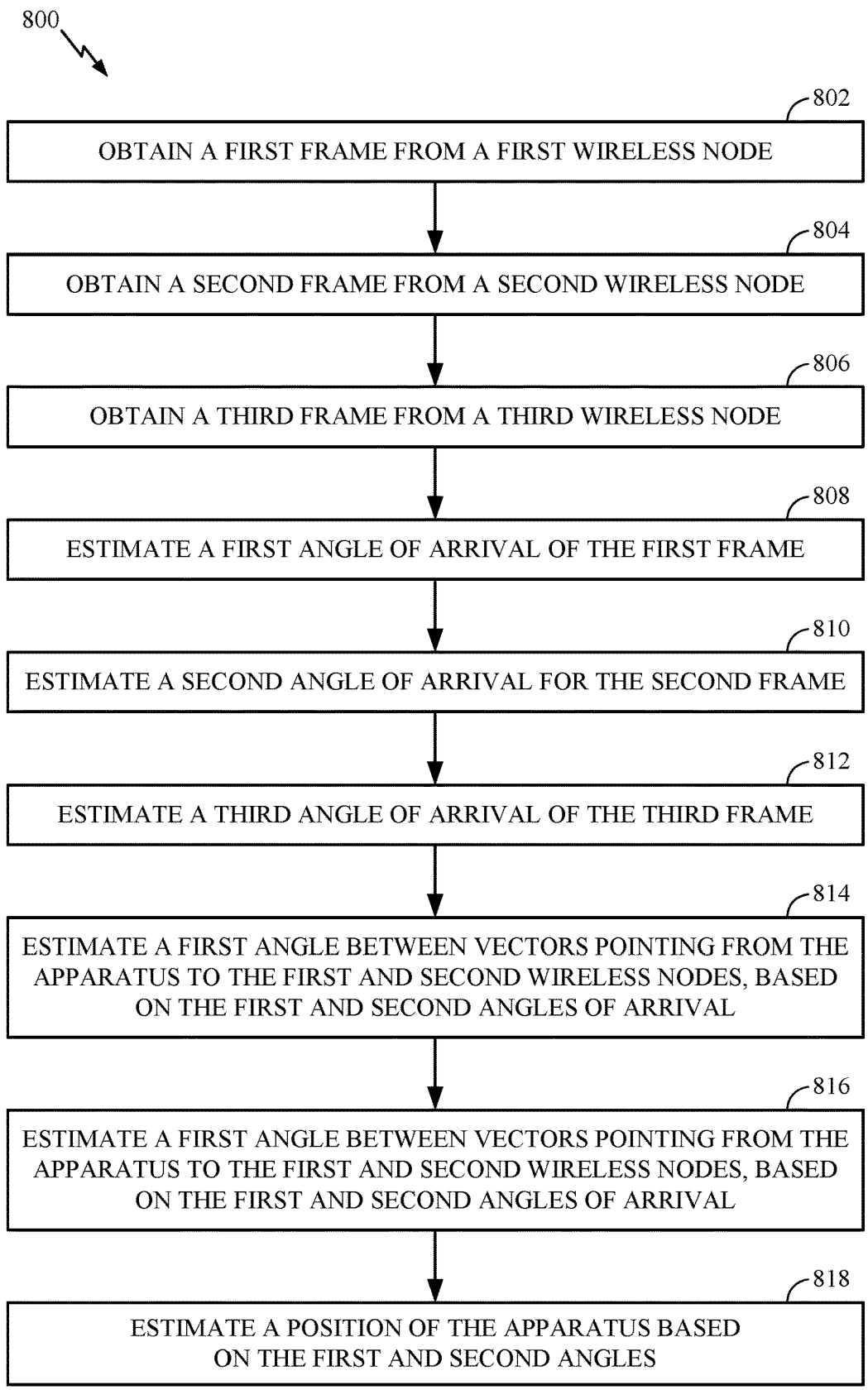
FIG. 8 illustrates example operations for performing positioning according to a second algorithm, in accordance with certain aspects of the present disclosure.

For example, FIG. 8 illustrates example operations 800 for estimating position based on directions of transmission from (two, three, or more) different wireless devices, in accordance with certain aspects of the present disclosure. The operations 800 may be performed, for example, by a STA in a general region that is within the transmission range of two APs (for a 2 dimensional location estimate) or three APs (for more accurate 2 dimensional location estimate or a 3 dimensional location estimate).

The STA may obtain a first frame from a first wireless node (at 802), obtain a second frame from a second wireless node (at 804), and obtain a third frame from a third wireless node (at 806). The STA may estimate a first angle of arrival of the first frame (at 808), estimate a second angle of arrival for the second frame (at 810), and estimate a third angle of arrival of the third frame (at 812).

The STA may estimate a first angle between vectors pointing from the apparatus to the first and second wireless nodes, based on the first and second angles of arrival (at 814) and estimate a second angle between vectors pointing from the apparatus to the second and third wireless nodes, based on the second and third angles of arrival (at 816).

Finally, the STA may estimate a position of the apparatus based on the first and second angles (at 818).

To use direction of arrival (e.g., AoA) at the STA in this manner, each sector sweep packet may be transmitted with TRN fields sent using the same direction. These training fields may allow the STA to measure AoA of the received packet, based on phase differences measured between elements of its antenna array.

Figure 9:
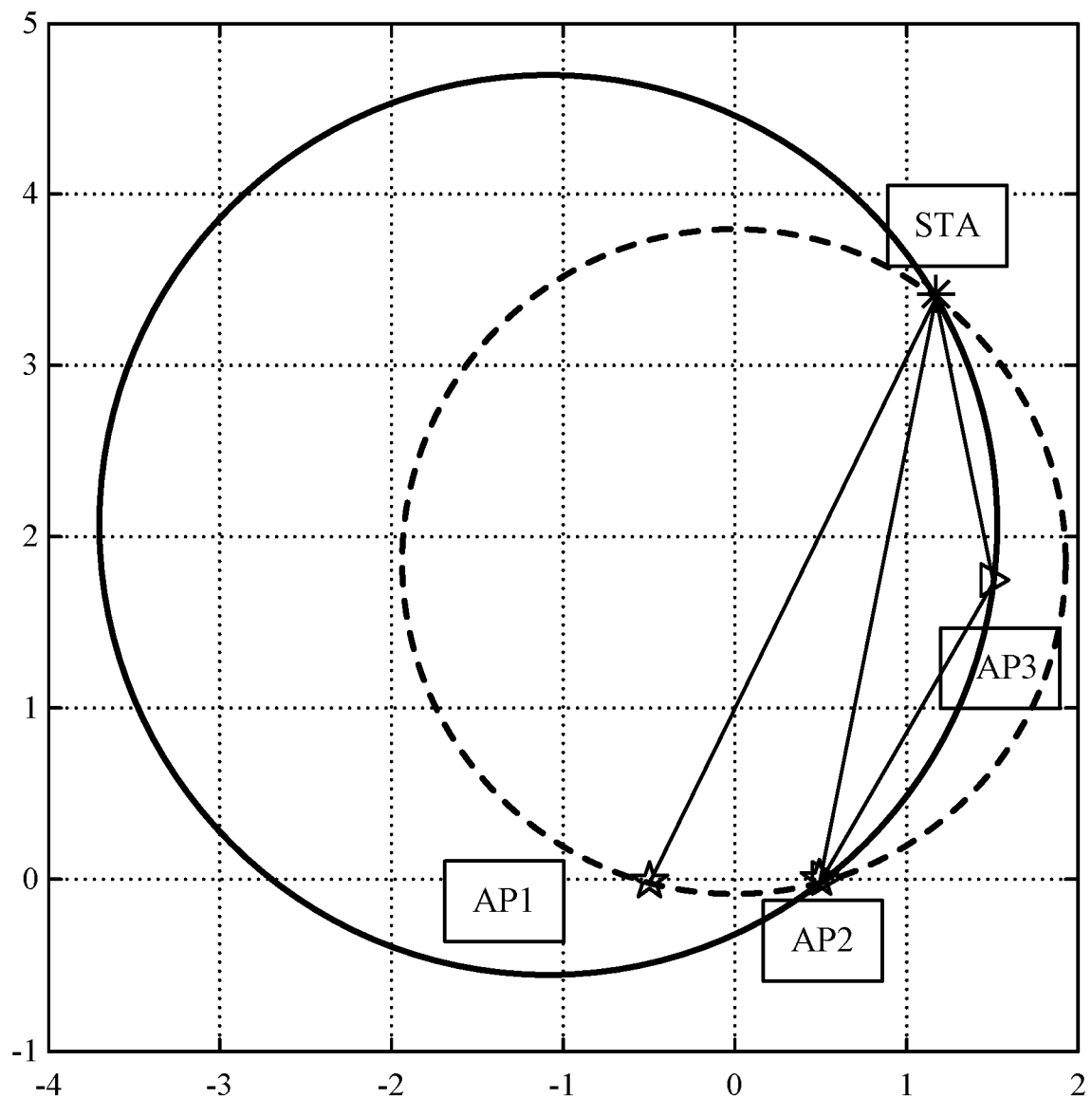
FIG. 9 illustrates how a station may estimate position based on the second algorithm, in accordance with certain aspects of the present disclosure.

In some cases, a STA may calculate an Angle difference of direction to 3 APs. In such cases, the STA performs AOA calculation to all APs using TRN fields added to each sector sweep frame. The STA then calculates angular difference to each STA using measured directions and estimates its location based on intersection of circles on based on inscribed angle and AP locations As illustrated in FIG. 9, using the AOAs from two different APs the difference angle of pointing vectors to these APs can be found. As illustrated in FIG. 9, this defines a section of a circle (in 3 dimensions, a sphere, spindle torus, or other geometric object). In two dimension, if the AP sits at points (in the x,y plain–(–d/2,0), (d/2), the circle can be parametrically defined as $x=D/\sin(\theta)\sin(\alpha+\theta)\cos(\alpha)-D/2$, $y=D/\sin(\theta)\sin(\alpha+\theta)$, where $\theta$ is the angle between directions and $0<\alpha<\pi-\theta$ is a running parameter. FIG. 9 shows how circles are formed from specific angles and the base lines which are the lines connecting the APs. The (2-D) position of the STA (within a plane) may be found as an intersection of the two circles (e.g., given the equations as defined above). As the intersection is at two points, information from the third AP may be used to resolve which of the two intersecting points to use for the position estimate. In this manner, 3 APs may allow estimation of location in a plane, while 4 APs allow location estimation in 3 dimensions. Similarly, 4 APs may allow the (3-D) position of the STA to be found as an intersection of three (or four) spheres/spindle toruses (e.g., given corresponding parametrically defined equations).

Aspects of the present disclosure also provide techniques where a station may perform positioning based on difference in time of arrival (DTOA—also referred to as time difference of arrival or TDOA) measurements for transmissions from different APs to the STA.

Figure 10:
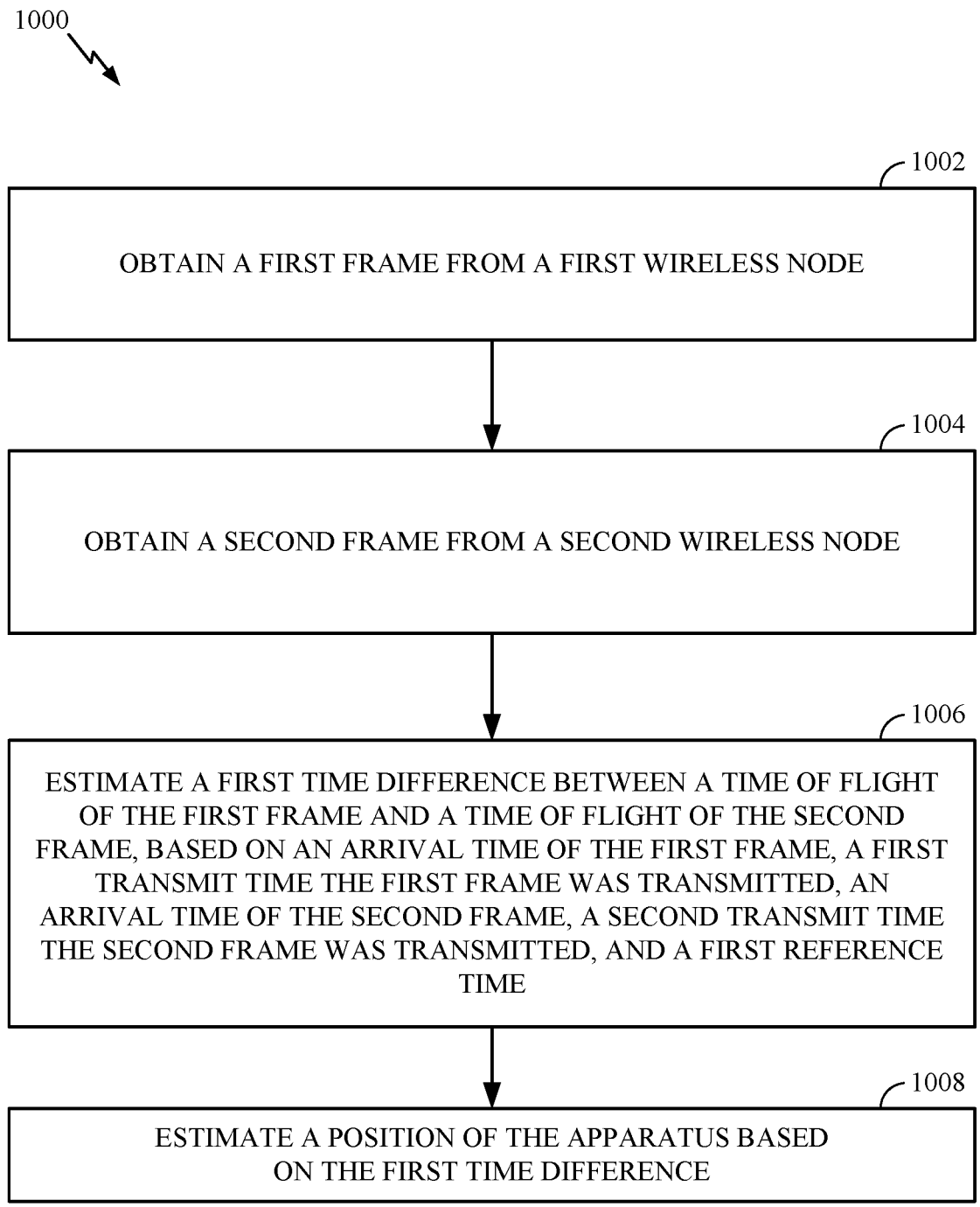
FIG. 10 illustrates example operations for performing positioning according to a third algorithm, in accordance with certain aspects of the present disclosure.

For example, FIG. 10 illustrates example operations 1000 for estimating position based on directions of transmission from different wireless devices, in accordance with certain aspects of the present disclosure. The operations 1000 may be performed, for example, by a STA in a general region that is within the transmission range of two or more APs.

Operations 1000 begin, at 1002, by obtaining a first frame from a first wireless node. At 1004, the STA obtains a second frame from a second wireless node. At 1006, the STA estimates a first time difference between a time of flight of the first frame and a time of flight of the second frame, based on an arrival time of the first frame, a first transmit time the first frame was transmitted, an arrival time of the second frame, a second transmit time the second frame was transmitted, and a first elapsed time since the second wireless node received a first reference frame from the first wireless node. At 1008, the STA estimates a position of the apparatus based on the first time difference.

In some cases, the first frame may include an indication of the first transmit time and the second frame may include an indication of the second transmit and an indication of the first elapsed time. In other cases, this information may be determined/inferred from a (broadcast or published) schedule.

Certain challenges may be presented by estimating location from the time difference for transmissions from different APs to the STAs may have. First, the different APs may transmit at different times as they are not accurately synchronized, and the STA cannot receive more than one transmission concurrently. Second, the transmissions from the APs to the STAs are directional, when an AP transmits to another AP, the STA may not receive the transmission.

Aspects of the present disclosure address these issues in the following manner. One AP may be designated a master AP and may start by transmitting a sector sweep. In this case, DTOA measurements may be enabled by having a master AP with a relatively accurate clock (e.g., with clock accuracy of 0.1 ppm), while the rest of the "secondary" APs only need to synchronize (accurately lock) their clocks to that of the master AP.

To perform DTOA based positioning, 3 APs or more may perform a sector sweep, with the time of each transmission know accurately in advance (start of sector sweep, time between sectors) or based on information in each sector sweep packet. With the start of the sweep synchronized accurately between APs, and the location of the APs known to all APs, DTOA measurements may be performed. Secondary APs receive the sector sweep packets from the Master AP. By knowing when they were transmitted (based on known schedule or information in the packet) and the distance to the master AP, accurate time can be estimated.

As noted above, in one approach, each packet in the sector sweep may contain an accurate time of transmission (e.g., a local time at which that packet was transmitted by the master AP), relative to the start of the sweep, and a sector identifier (CDOWN). The second AP receives (at least one) packet sent with a TX sector from the master AP, and in response starts transmitting its own sector sweep. In each sector sweep transmission, the second AP may indicate how much time has passed since it received the best sector from the first AP, and what the CDOWN of that sector was (or the time it was transmitted), as published by the master AP. If more than two APs are involved, the other APs may follow in the same way (e.g., triggering their own sector sweeps upon detecting a sector from the master AP).

In some cases, processing at the STA is as follows, with the following assumptions:
1. Sector p1 transmitted from the master AP at time T1 is received at time t1.
2. Sector p12 was transmitted from the AP at time T21
3. Sector p2 transmitted from the second AP T2 seconds after sector p12 was received from the master AP, is received at time t2.

Thus, T2 can serve as a point of reference as to a time of flight between and relative clock timing between the master AP and the second AP. To facilitate understanding, it may be assumed that p12>p1, that $\Delta T_1$ is the time of flight from the master AP to the STA, that $\Delta T_2$ is the time of flight from the second AP to the STA, and that $\Delta T_{12}$ is the time of flight from the Master AP to the second AP.

At the STA, the difference in time of arrival of interest:

$$DTOA_{12} = \Delta T_1 - \Delta T_2$$

Which can be inferred at the STA based on the following equations:

$$t_1 = T_1 + \Delta T_1$$

$$t_2 = T_{21} + \Delta T_{12} + T_2 + \Delta T_2$$

$$t_2 - t_1 = \Delta T_2 - \Delta T_1 + T_{21} + T_2 + \Delta T_{12} - T_1$$

$T_{21} - T_1$ is the time between two sector transmissions at the master AP—which can be determined from the CDOWN or from the times published in the sectors transmitted by AP2 (e.g. p2). As noted above, $T_2$ may be published in every sector (frame) sent by AP2. $\Delta T_{12}$ can be deduced from the published locations of the APs or also transmitted in each sector sweep packet of non-Master AP. Based on this information, a STA may deduce $\Delta T_2 - \Delta T_1$ from $t_2 - t_1$.

A STA may perform this same process with other non-Master APs, generating enough DTOAs to determine the location of the STAs. Two DTOA calculations may be used for a 2 dimensional location estimate (e.g., in a plane), while 3 DTOAs may be used for a 3 dimensional location estimate.

As noted above, in another approach, the sector sweep schedule of each AP may be known beforehand. In other words, based on the schedule, the times at which the packets are supposed to be transmitted are known to the receiver. The schedule may indicate when a master AP (e.g., AP1) AP1 would begin its sector sweep. Based on this beginning time and a time between sweep packets, a receiver (e.g., AP2 or AP3) can determine the time of flight of each packet.

The schedule may also indicate that AP2 will transmit its sectors sweep at a known time after the sector sweep if AP1. For example, by knowing the time between sectors and the time between each sector sweep, AP2 can determine when to start its own sector sweep. This information may be considered "dynamic" passive location information, as opposed to "static" information (such as a fixed location of an AP, number of sectors, direction of each sector, and the like).

Based on the scheduling information, all devices will know exactly when the packets are transmitted. In this manner, secondary APs can determine when to start its sector sweep based on the received packets from AP1. This scheduled approach may help simplify the calculation the receiving device has to do, provided it is able to receive the schedule beforehand (e.g., from one of the other APs, published in advance).

Figure 11A:
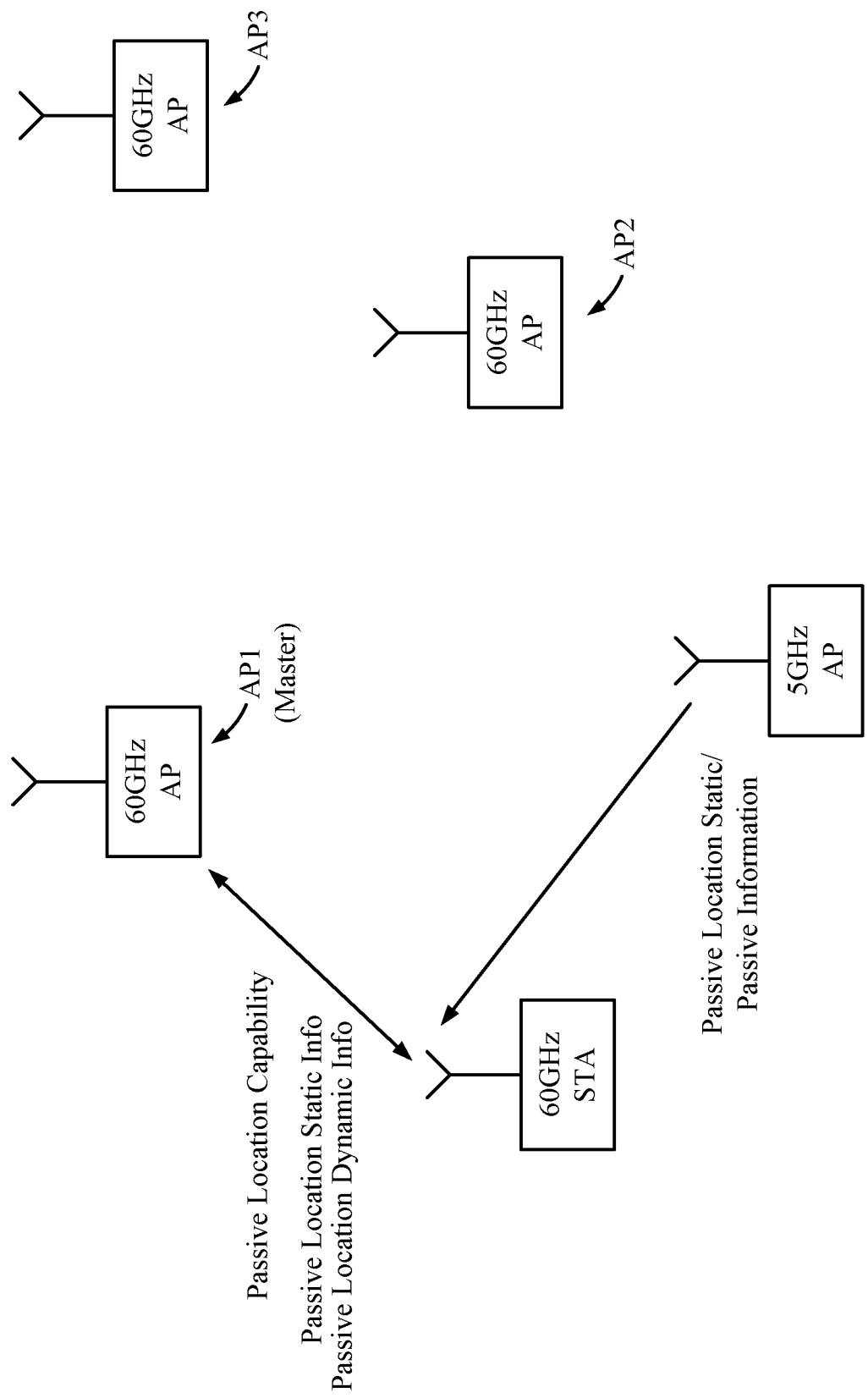
FIGS. 11A and 11B illustrate setup and location phases, respectively, of a system utilizing directional transmissions from multiple base stations to estimate position, in accordance with certain aspects of the present disclosure.

As illustrated in FIG. 11A, during a setup phase, 60 GHz APs (master AP1, secondary AP1, and secondary AP2) may indicate capability to send passive 60 GHz location information (e.g., via a broadcast message). 5 GHz APs may indicate static/dynamic 60 GHz location information to use (info to use). A STA performing passive positioning may request the (static and passive) location information to be used for in the positioning algorithm. In response, the AP sends static and dynamic passive 60 GHz information.

Figure 11B:
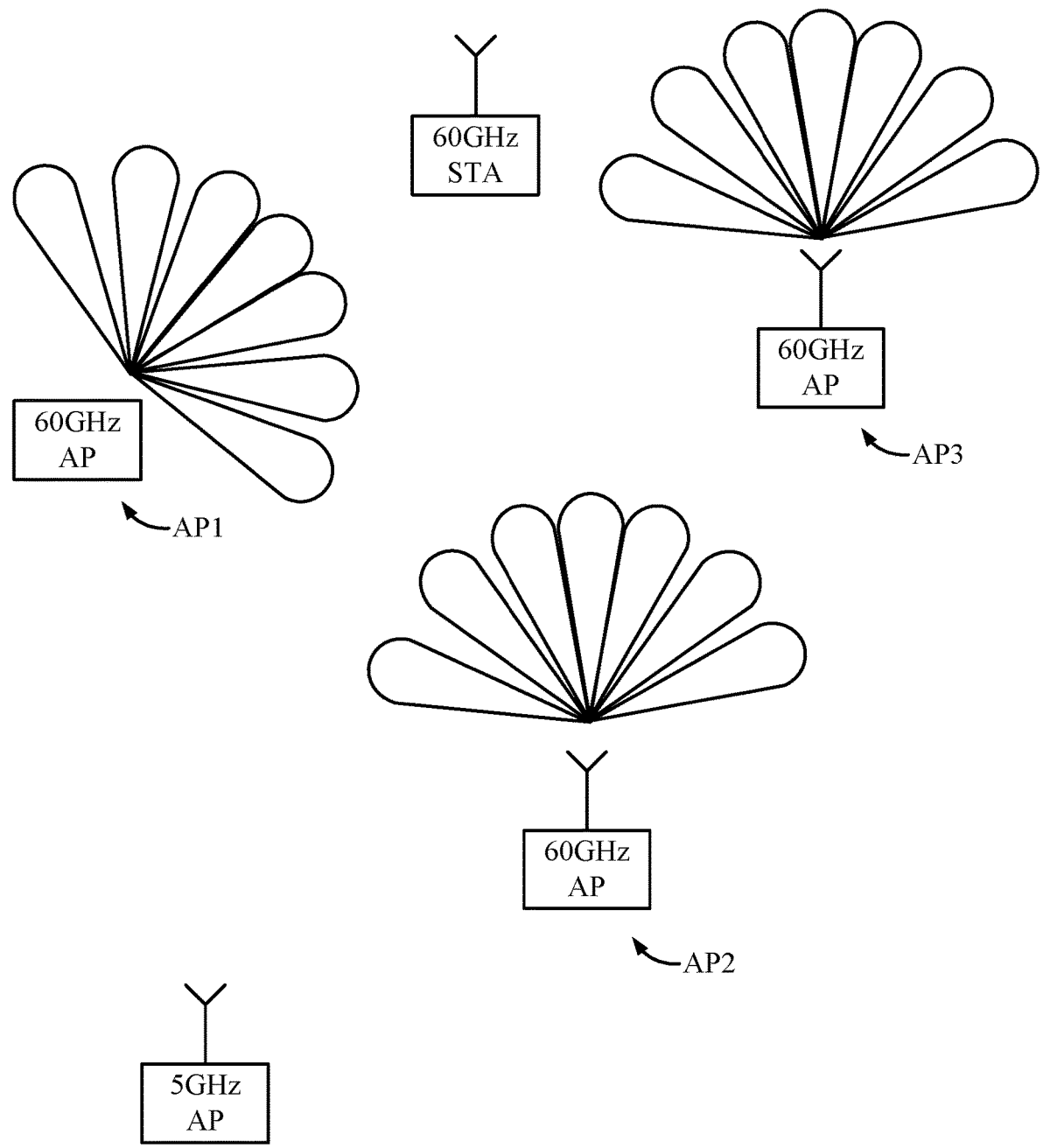

During the location phase, shown in FIG. 11B, while master AP1 performs a sector sweep, STA may take measurements (based on any of the techniques described above), while (secondary) AP2 and AP3 lock their timing to AP1. Subsequently, AP1 and AP2 may each perform their own non-overlapping sector sweeps, while STA takes measurements. Subsequently the STA may estimate position and repeat as appropriate (e.g., periodically or based on mobility). Position estimates may be reported, passed up to applications, or used for other purposes.

Figure 12:
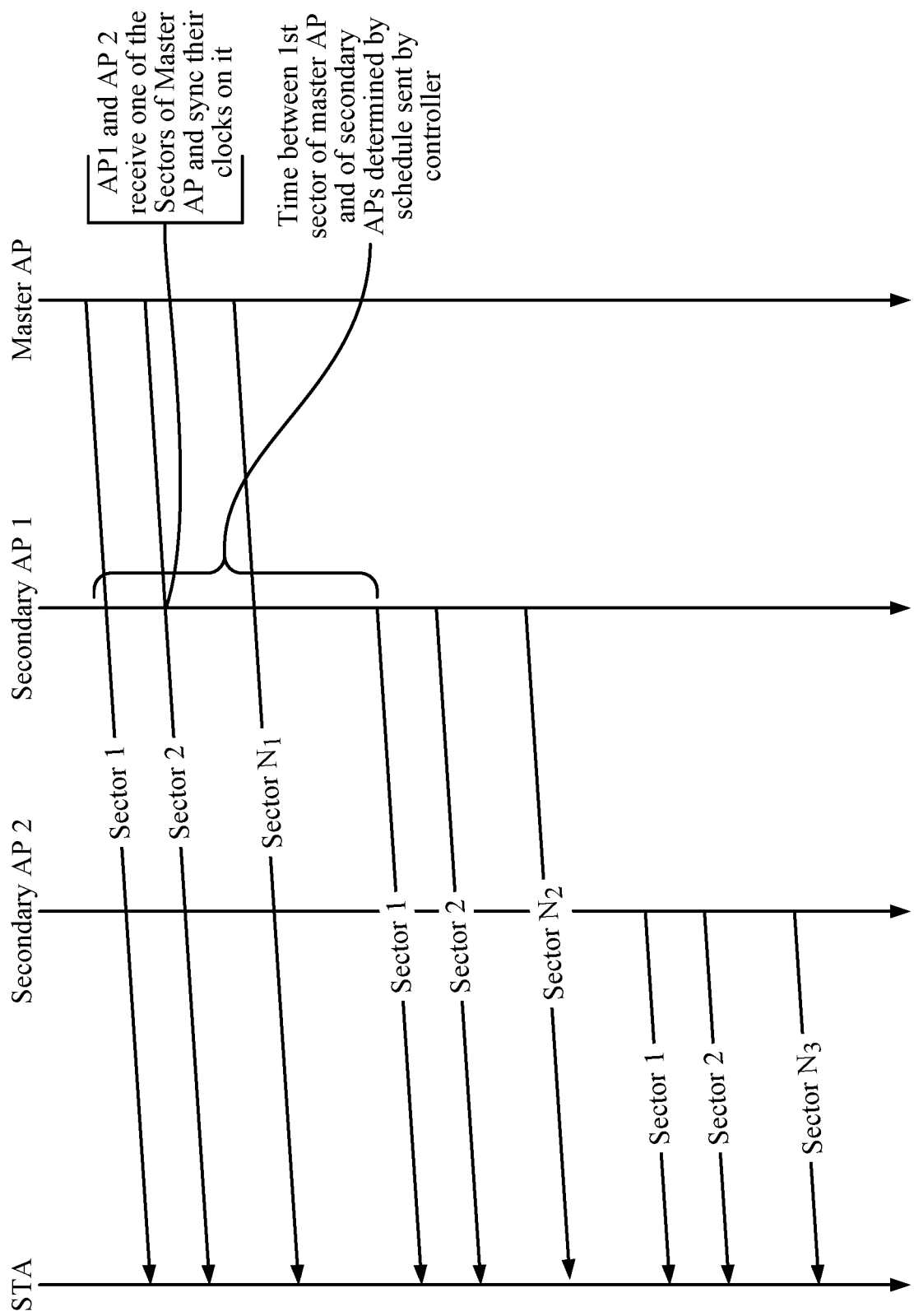
FIG. 12 is a call flow diagram illustrating an example protocol for passive location using in difference in time of arrival (DTOA) measurements in the system shown in FIGS. 11A and 11B.

FIG. 12 is an example call flow diagram illustrating one example of a protocol for performing passive positioning in the system shown in FIGS. 11A and 11B. As illustrated, secondary APs AP2 and AP3 may receive one of the sectors of the master AP1 sector sweep and synchronize their clocks accordingly. In other words, based on the known start time of the master AP sweep and the information in the received sector (e.g., which sector it is in a known ordered sequence), the secondary APs can relatively accurately estimate the time. Based on the known scheduling information, the secondary APs can also determine when to start their own sector sweeps. The start time of each secondary AP sweep may be determined as the calculated difference in time between the first sector of the master AP (which can be determined from any received sector) and the scheduled time between the sector sweeps.

Static and dynamic information for passive positioning may be gathered in various ways. For example, static information may be broadcast, while a station may request dynamic information. In some cases, capability information may be gathered during association (e.g., via a 60 GHz Location Capability bit that indicates that there are APs in the area that provide passive location). Other information may be gathered, for example, when each 60 GHz STA associates with a 60 GHz AP. Such information may be gathered from a source other than an AP acting as a location server or even in a different band (e.g., using a sub 6 GHz network). As will be described in greater detail below, such passive location static information may include APs location (LCI), AP Channels, APs set of sectors (Earth directions for each sector), a number of sectors for each AP, TRN subfields per APs (e.g., for AOD or AOA, how many and a direction of each sector), when each sector sweep starts after the first one (accurate time), and AP Antenna array details.

FIG. 13A illustrates an example information element (IE) format for conveying static information for passive positioning. This information may be considered static, for example, as it changes slowly and may be gathered once by a STA as it enters an area. As illustrated, the format may include a BSSid of the AP (broadcasting the information), an LCI field providing an accurate location of the AP, a number of sectors (in a sweep) used for passive location. In some cases, information for each sector may be provided, such as azimuthal and elevation direction, as well as azimuthal and elevation widths. In some cases, an accurate altitude above floor, a time between sectors, and channel may also be provided. As indicated above, knowing a time between sectors allows a receiver to determine a time since a start of a sector sweep from a single received sector, based on the ordered sequence of the sweep.

FIG. 13B illustrates an example IE format for conveying dynamic information for passive positioning. This IE may be contained in a passive location dynamic information frame, which may have several such IEs for scheduling sector sweeps with (possibly) different APs. In some cases, a STA may request information regularly to gather updated information. As illustrated, the format may include an indication of how many APs are participating in the positioning sector sweeps, as well as their Besides. The IE may also indicate a time of a next sector sweep, for example, as a time from the start of the message to when the master AP starts its sector sweep. The IE may also indicate the order of the APs in the sweep and an identifier for a specific sector sweep (for which this IE applies).

Various packet formats may be used in the sector sweep, such as a (regular) Sector Sweep frame or a Short Sector Sweep packet. A Sector Sweep frame generally has a proper MAC frame format. One of the reserved bits in the Sector Sweep feedback field may be used to indicate that this sweep is used for location purposes and no feedback is allowed. It is generally easy to add TRN fields (even enhanced directional multi-gigabit EDMG TRN fields) to such sector sweep frames. Short Sector Sweep packets may be significantly shorter (e.g., 40% Shorter) than regular Sector Sweep frames. In some cases, a packet type bit may be used to indicate a different use. Short Sector sweep packets may be limited (e.g., to 6 bytes) and may have no proper addressing (e.g., instead relying on scheduling information described above). As it may be difficult to add TRN fields (e.g., due to size restrictions), it may need to be known in advance that it contains TRN fields.

As described above, the passive positioning techniques presented herein provide an efficient mechanism, for example, allowing many STAs to determine their location using the same set of sector sweeps.

The techniques described above are relatively simplified and, in practice, clock inaccuracies in the APs may affect accuracy of DTOA calculations (and corresponding location estimates). In some cases, it may be assumed that the Master AP has a clock accuracy which is lower than 1 ppm, preferably 0.1 ppm, and that the other APs and the STAs calculate their clock offsets and modify published times according to these clock offsets.

Figure 5A:
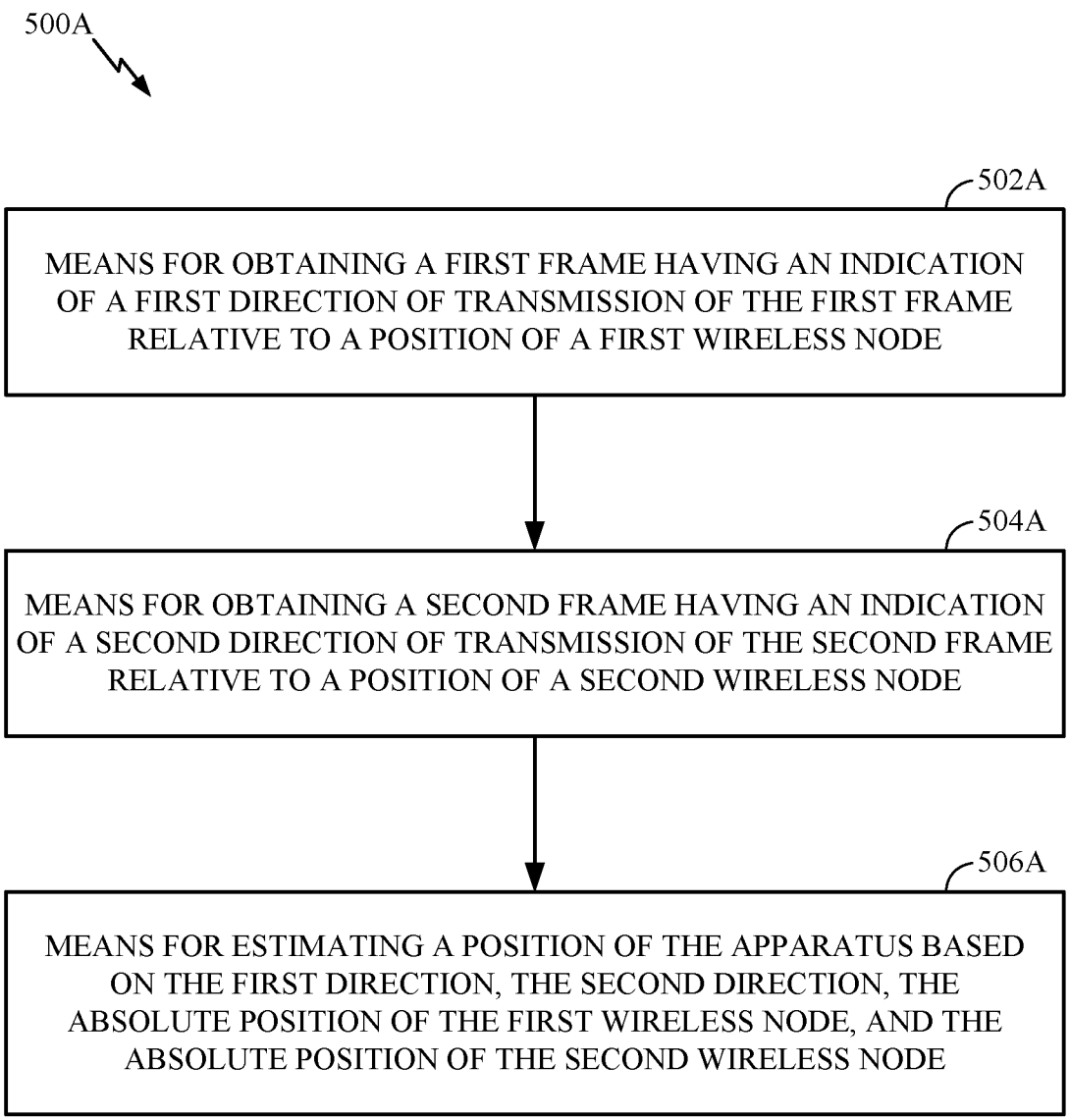
FIG. 5A illustrates example components capable of performing the operations shown in FIG. 5.
Figure 8A:
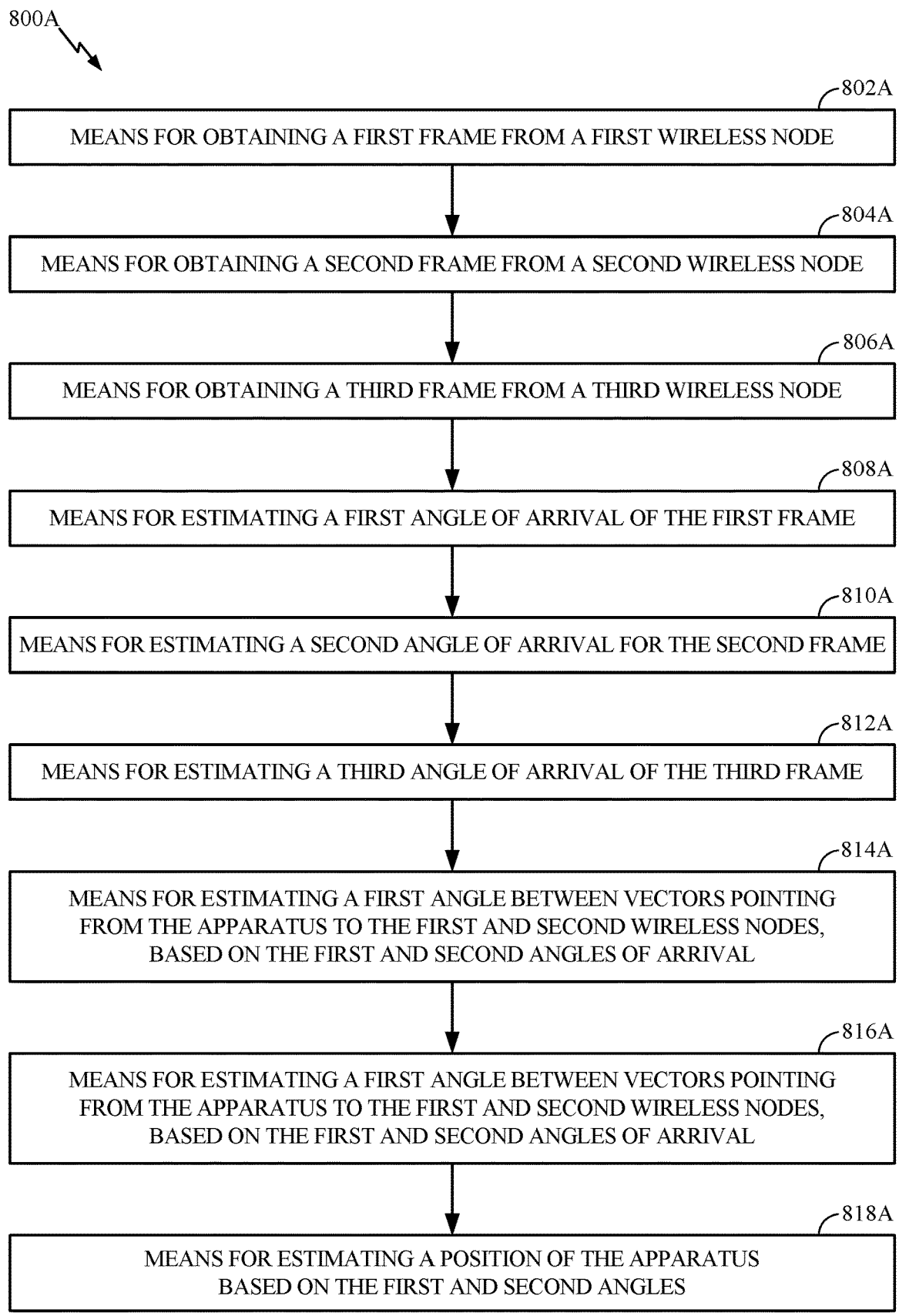
FIG. 8A illustrates example components capable of performing the operations shown in FIG. 8.
Figure 10A:
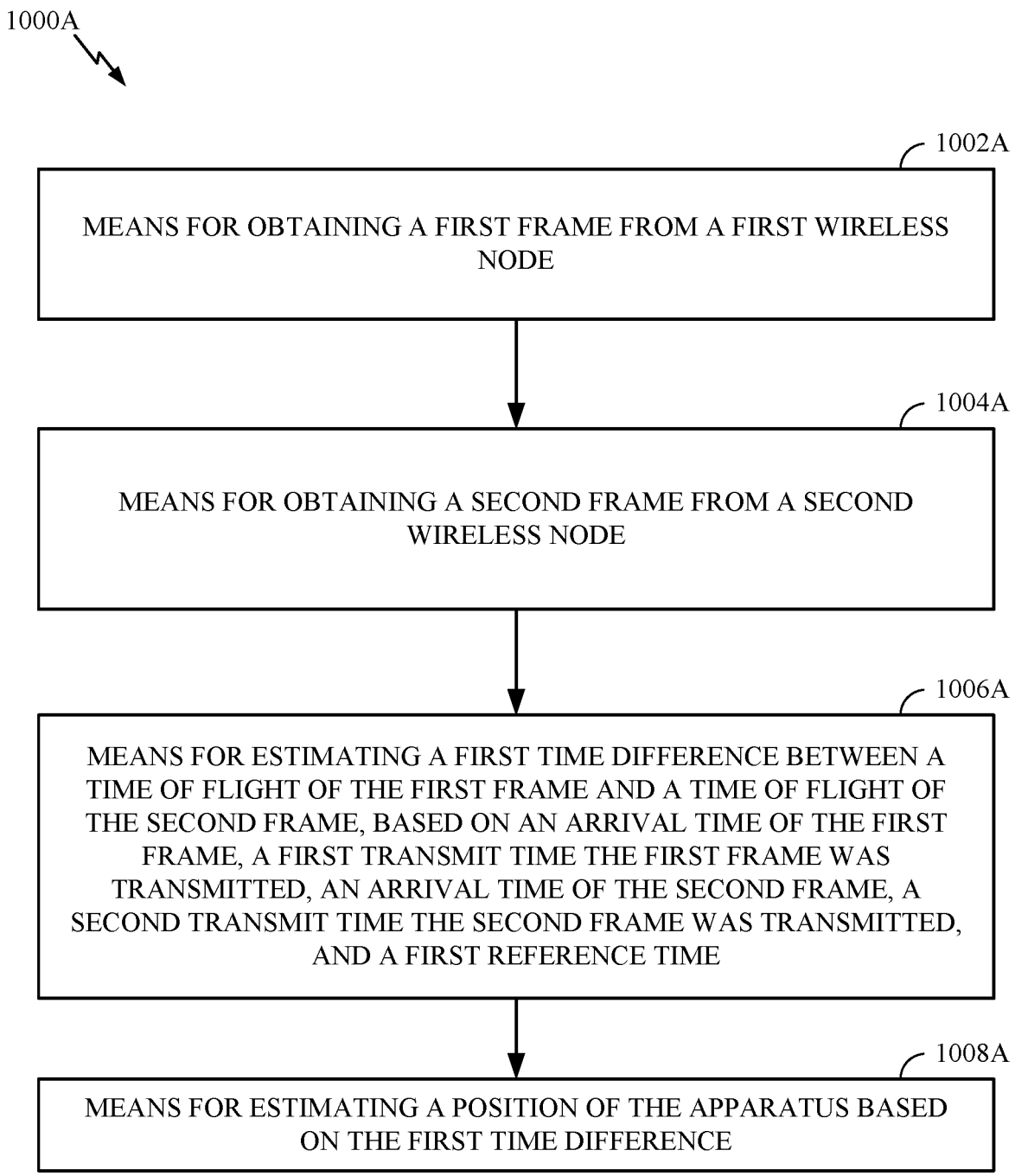
FIG. 10A illustrates example components capable of performing the operations shown in FIG. 10.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500, 800, and 1000 illustrated in FIGS. 5, 8, and 10 correspond to means 500A, 800A, and 1000A illustrated in FIGS. 5A, 8A, and 10A.

For example, means for obtaining may comprise a receiver (e.g., the receiver unit 222) and/or an antenna(s) 224 of the access point 110 or the receiver unit 254 and/or antenna(s) 254 of the user terminal 120 illustrated in FIG. 2. Means for estimating and/or means for determining may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   an interface configured to obtain:
      a first frame, during a first sector sweep procedure, having an indication of a first direction of transmission of the first frame relative to a position of a first wireless node, and
      a second frame, during a second sector sweep procedure, having an indication of a second direction of transmission of the second frame relative to a position of a second wireless node; and
   a processing system configured to estimate a position of the apparatus based on the first direction, the second direction, the position of the first wireless node, and the position of the second wireless node,
   wherein the estimation is further based on one or more training fields, associated with the first and second frames, obtained during the first and second sector sweep procedures.

2. The apparatus of claim 1, wherein:
   the first frame also has an indication of the position of the first wireless node; and
   the second frame also has an indication of the position of the second wireless node.

3. The apparatus of claim 1,
   wherein the first and second sector sweep procedures are non-overlapping in time.

4. The apparatus of claim 1, wherein the estimation comprises estimating a position of an intersection of:
   a first line corresponding to transmission of the first frame from the position of the first wireless node in the first direction; and
   a second line corresponding to transmission of the second frame from the position of the second wireless node in the second direction.

5. The apparatus of claim 4, wherein:
   the first and second lines correspond to one or more sectors for the one or more training fields with a predetermined power.

6. The apparatus of claim 1, wherein:
   the interface is also configured to obtain a third frame having an indication of a third direction of transmission of the third frame relative to a position of a third wireless node, and
   the estimation is also based on the third direction and the position of the third wireless node.

7. The apparatus of claim 1, wherein:
   the indication of the first direction and the indication of the second direction are obtained via different frequency bands.

8. The apparatus of claim 1, further comprising at least one antenna via which the first frame and the second frame are obtained, wherein the apparatus is configured as a wireless device.

* * * * *